(12) United States Patent
Kinoshita

(10) Patent No.: US 11,327,389 B2
(45) Date of Patent: May 10, 2022

(54) IMAGE PROJECTION SYSTEM AND METHOD OF CONTROLLING IMAGE PROJECTION SYSTEM

(71) Applicant: SEIKO EPSON CORPORATION, Tokyo (JP)

(72) Inventor: Shoichi Kinoshita, Beppu (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/213,991

(22) Filed: Mar. 26, 2021

(65) Prior Publication Data

US 2021/0302810 A1   Sep. 30, 2021

(30) Foreign Application Priority Data

Mar. 27, 2020 (JP) .............................. JP2020-057352

(51) Int. Cl.
 *G03B 21/00* (2006.01)
 *G03B 21/20* (2006.01)
 *G03B 21/56* (2006.01)
 *H04N 9/31* (2006.01)

(52) U.S. Cl.
 CPC ....... *G03B 21/005* (2013.01); *G03B 21/2033* (2013.01); *G03B 21/56* (2013.01); *H04N 9/31* (2013.01)

(58) Field of Classification Search
 CPC combination set(s) only.
 See application file for complete search history.

(56) References Cited

U.S. PATENT DOCUMENTS

| 2013/0342816 A1* | 12/2013 | Furui | G03B 21/147 |
| | | | 353/69 |
| 2019/0206027 A1* | 7/2019 | Uemura | H04N 9/3188 |
| 2019/0346754 A1* | 11/2019 | Inagaki | H04N 9/3194 |

FOREIGN PATENT DOCUMENTS

| JP | 2005-102277 A | 4/2005 |
| JP | 2006-245737 A | 9/2006 |
| JP | 2011-29727 A | 2/2011 |

* cited by examiner

*Primary Examiner* — Sultan Chowdhury
(74) *Attorney, Agent, or Firm* — Oliff PLC

(57) ABSTRACT

A method of controlling an image projection system that includes a plurality of projectors including a first projector and a second projector having a lens shift function, and that includes an imaging device, includes: projecting, by the first projector, a first pattern having a first color tone; projecting, by the second projector, a second pattern having a second color tone; generating, by the imaging device, a captured image obtained by capturing a composite image including the first and second pattern; determining, by the first projector, whether an area of an overlapping portion of the second pattern in the captured image is equal to or larger than a predetermined ratio; and causing, by the first projector, the second projector to perform lens shift by the lens shift function of the second projector such that the second pattern overlaps the first pattern, when the area is less than the predetermined ratio.

7 Claims, 7 Drawing Sheets

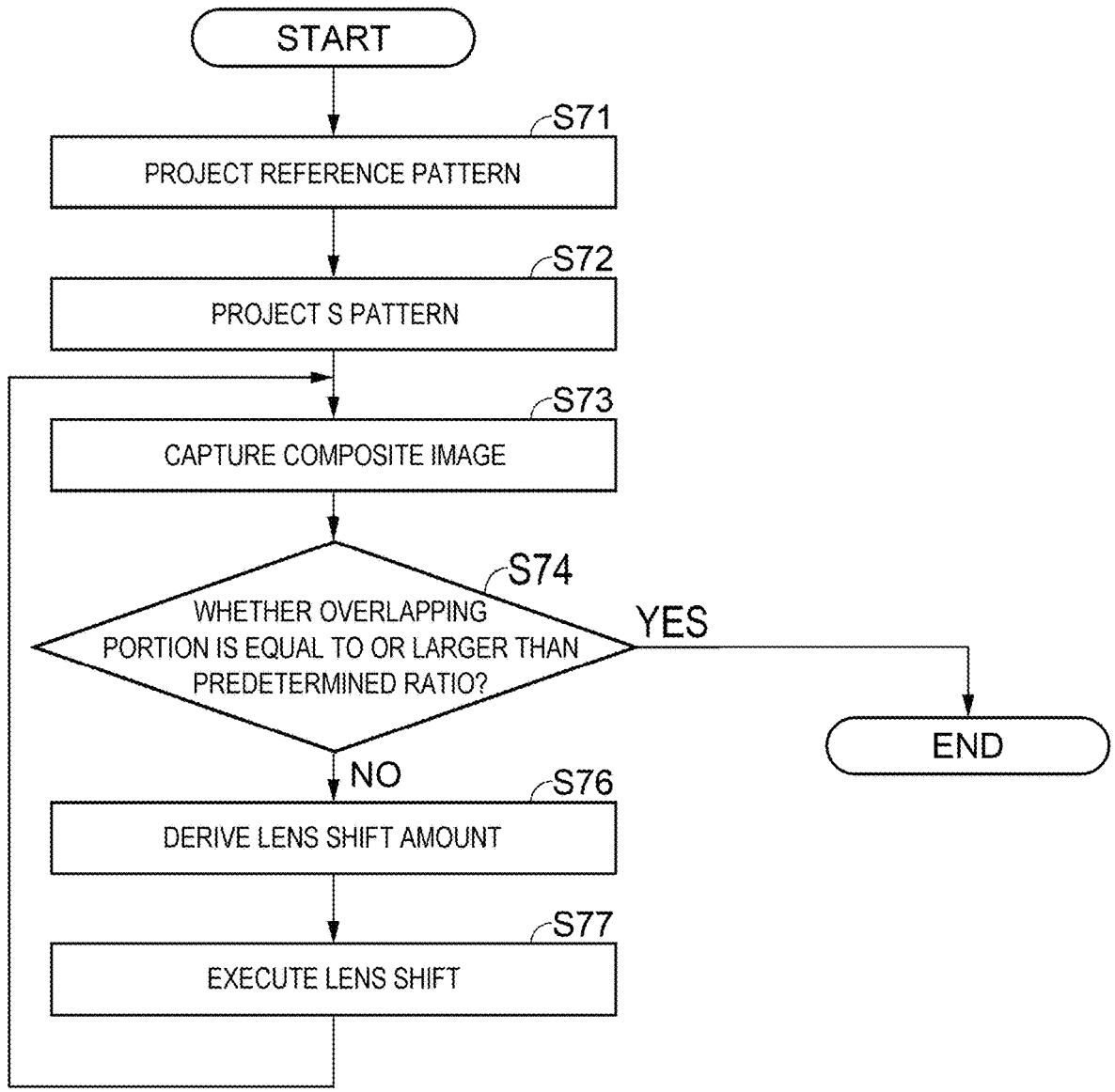

FIG. 4C
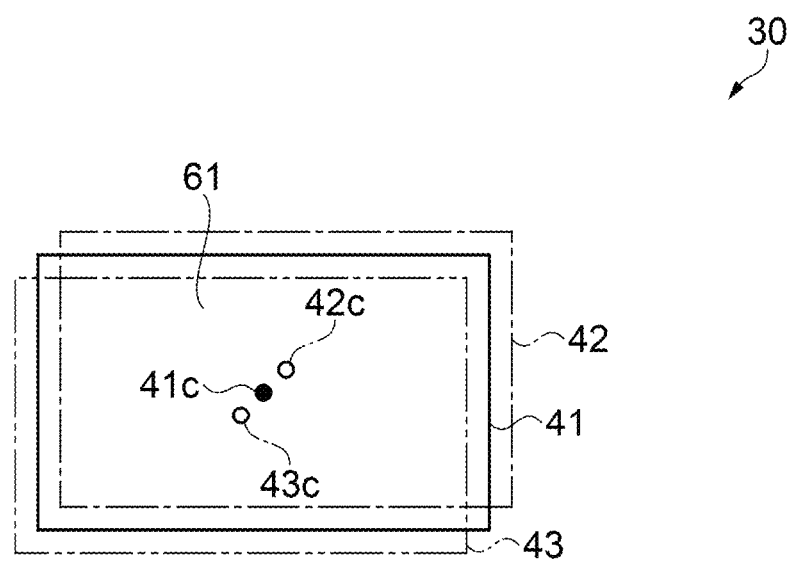
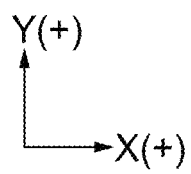

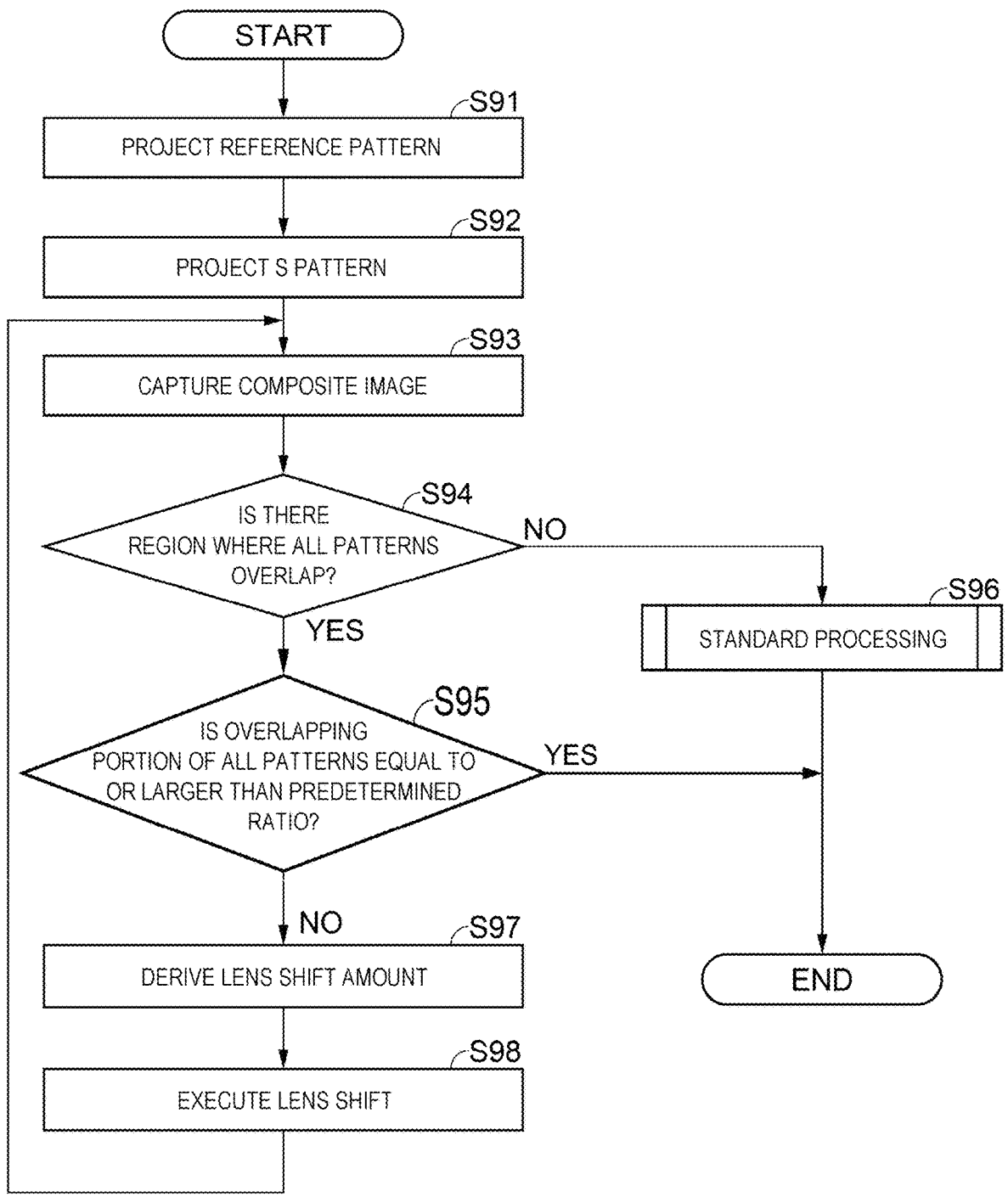

IMAGE PROJECTION SYSTEM AND METHOD OF CONTROLLING IMAGE PROJECTION SYSTEM

The present application is based on, and claims priority from JP Application Serial Number 2020-057352, filed Mar. 27, 2020, the disclosure of which is hereby incorporated by reference herein in its entirety.

BACKGROUND

1. Technical Field

The present disclosure relates to an image projection system and a method of controlling an image projection system.

2. Related Art

An image projection system that implements a bright image or a large image by using projected images of a plurality of projectors is known. According to the system, it is possible to perform stack projection in which an image brighter than individual images can be obtained by overlapping a plurality of projected images or multi-screen projection in which an image larger than individual images can be obtained by arranging a plurality of projected images vertically and horizontally. When such stack projection or multi-screen projection is to be performed, it is necessary to align positions of projected images from a plurality of projectors, and therefore various alignment methods are proposed.

For example, in an image projection device in JP-A-2011-29727, the same collation patterns are projected on a plurality of projectors, and positions of projected images are adjusted such that the collation patterns overlap each other. A cross-shaped pattern is used as the collation patterns.

However, a method in JP-A-2011-29727 has a problem that the pattern cannot be recognized and adjustment becomes difficult due to a state of a projected surface to be a screen. For example, when the projected surface has irregularities, the cross-shaped pattern may be distorted by the irregularities, making it difficult to recognize the collation patterns.

SUMMARY

Therefore, an object of the present disclosure is to provide an image projection system capable of adjusting a position of a projected image regardless of a state of a projected surface, and a method of controlling the system.

A method of controlling an image projection system according to the present disclosure is a method of controlling an image projection system that includes a plurality of projectors including a first projector and a second projector having a lens shift function and that includes an imaging device, the method including: projecting, by the first projector, a first pattern having a first color tone; projecting, by the second projector, a second pattern having a second color tone; generating, by the imaging device, a captured image obtained by capturing a composite image including the first pattern and the second pattern; determining, by the first projector, whether an area of an overlapping portion of the second pattern with respect to the first pattern in the captured image is equal to or larger than a predetermined ratio; and causing, by the first projector, the second projector to perform lens shift by the lens shift function of the second projector such that the second pattern overlaps the first pattern, when the area is less than the predetermined ratio.

A method of controlling an image projection system according to the present disclosure is a method of controlling an image projection system that includes a plurality of projectors including a first projector, a second projector, and a third projector having a lens shift function, and that includes an imaging device, the method including: projecting, by the first projector, a first pattern having a first color tone; projecting, by the second projector, a second pattern having a second color tone; projecting, by the third projector, a third pattern having a third color tone; generating, by the imaging device, a captured image obtained by capturing a composite image including the first pattern, the second pattern, and the third pattern; obtaining, by the first projector, an area of an overlapping portion in which the first pattern, the second pattern, and the third pattern overlap each other in the captured image, and determining whether the area of the overlapping portion with respect to the first pattern is equal to or larger than a predetermined ratio; and causing, by the first projector, at least one of the second projector and the third projector to perform lens shift by the lens shift function of the second projector or the lens shift function of the third projector such that at least one of the second pattern and the third pattern overlaps the first pattern, when the area is less than the predetermined ratio.

An image projection system according to the present disclosure is an image projection system including a plurality of projectors having a lens shift function and an imaging device, the image projection system including: a first projector configured to project a first pattern having a first color tone; and a second projector configured to project a second pattern having a second color tone, in which the first projector is communicably connected to the second projector and the imaging device, the imaging device is configured to capture a composite image including the first pattern and the second pattern, and the first projector causes, when an area of an overlapping portion of the second pattern with respect to the first pattern in the captured image is less than a predetermined ratio, the second projector to perform lens shift by the lens shift function of the second projector such that the second pattern overlaps the first pattern.

BRIEF DESCRIPTION OF THE DRAWINGS

FIG. 3 is a flowchart showing a method of controlling the image projection system.

FIG. 4C is a diagram showing one aspect of the composite image.

FIG. 5 is a flowchart showing a control method according to a second embodiment.

DESCRIPTION OF EXEMPLARY EMBODIMENTS

First Embodiment

Overview of Image Projection System

Figure 1:
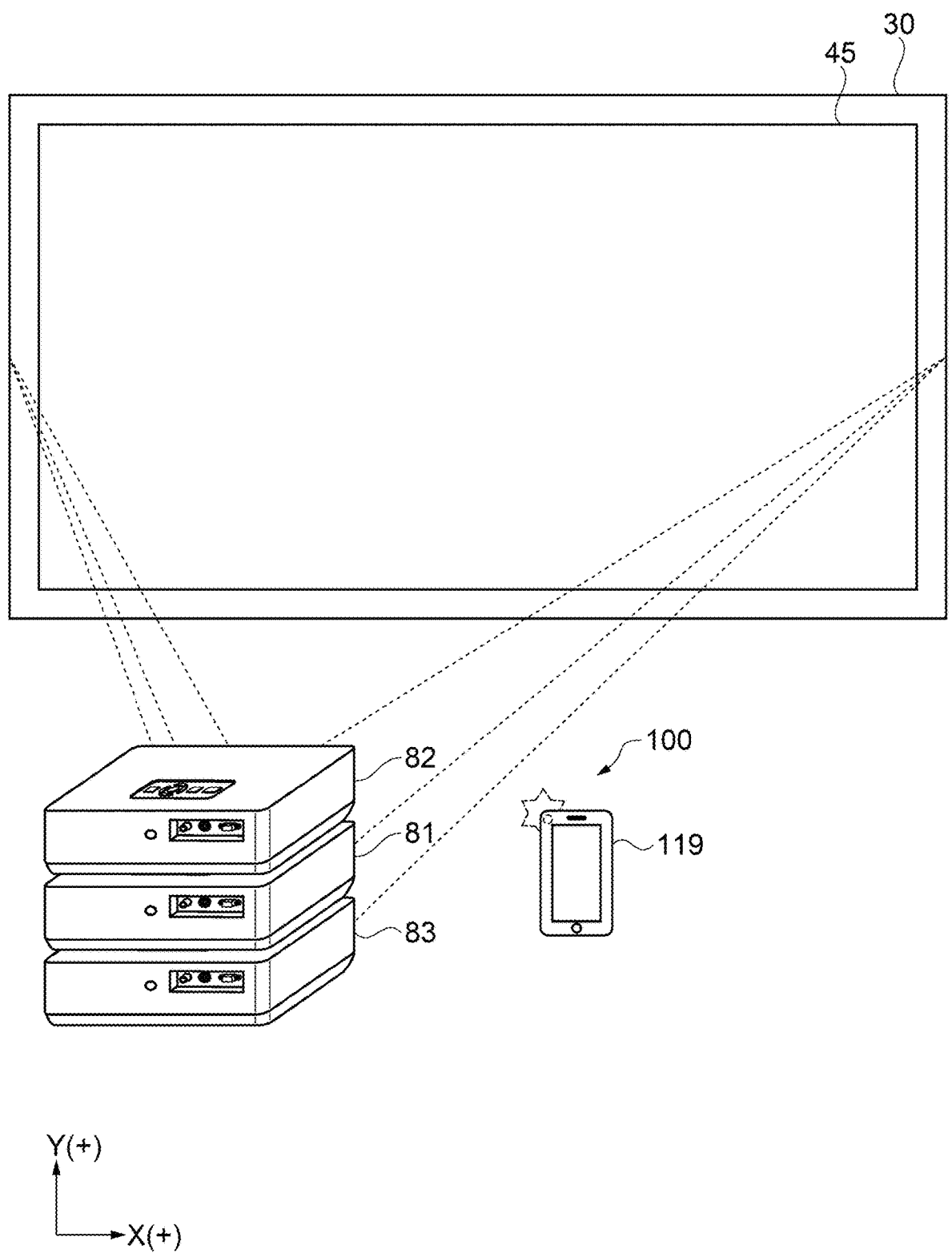
FIG. 1 is a schematic configuration diagram of an image projection system according to a first embodiment.

FIG. 1 is a schematic configuration diagram of an image projection system according to an embodiment.

An image projection system 100 includes a projector 81, a projector 82, a projector 83, or the like connected to a common network. As shown in FIG. 1, the image projection system 100 performs stack projection in which three projected images projected by three projectors are overlapped on a screen 30. A long side direction of the rectangular screen 30 is described as an X direction, and a short side direction is described as a Y direction. An X(+) direction is referred to as right, an X(−) direction is referred to as left, a Y(+) direction is referred to as up, and a Y(−) direction is referred to as down.

In FIG. 1, the three projectors are disposed in a state in which the projector 83, the projector 81, and the projector 82 are stacked in this order from the bottom. The projector 81 in the middle is a master projector as a first projector, and controls the upper projector 82 and the lower projector 83.

The projector 82 is a slave projector, and corresponds to a second projector. The projector 83 is also a slave projector, and corresponds to a third projector. The slave projector is also referred to as a slave device. In the following description, a projected image of the projector 81 is referred to as a reference image, and an image obtained by overlapping projected images of the three projectors 81, 82, and 83 is referred to as a composite image.

In a preferred example, the three projectors are the same. The configuration is not limited to three projectors, but may be a configuration including a plurality of projectors. For example, a local area network (LAN) is used as a common network, and communication is performed between the three projectors 81, 82, and 83 according to the Ethernet (registered trademark) standard.

In FIG. 1, a composite image 45 on which three projected images from the three projectors 81, 82, and 83 are overlapped is displayed on the screen 30. The composite image 45 has a rectangular shape that is one size smaller than the screen 30, and fits the screen 30, and the composite image 45 shows a state after the alignment of the three projected images is performed by a control method described later.

Schematic Configuration of Projector

Figure 2:
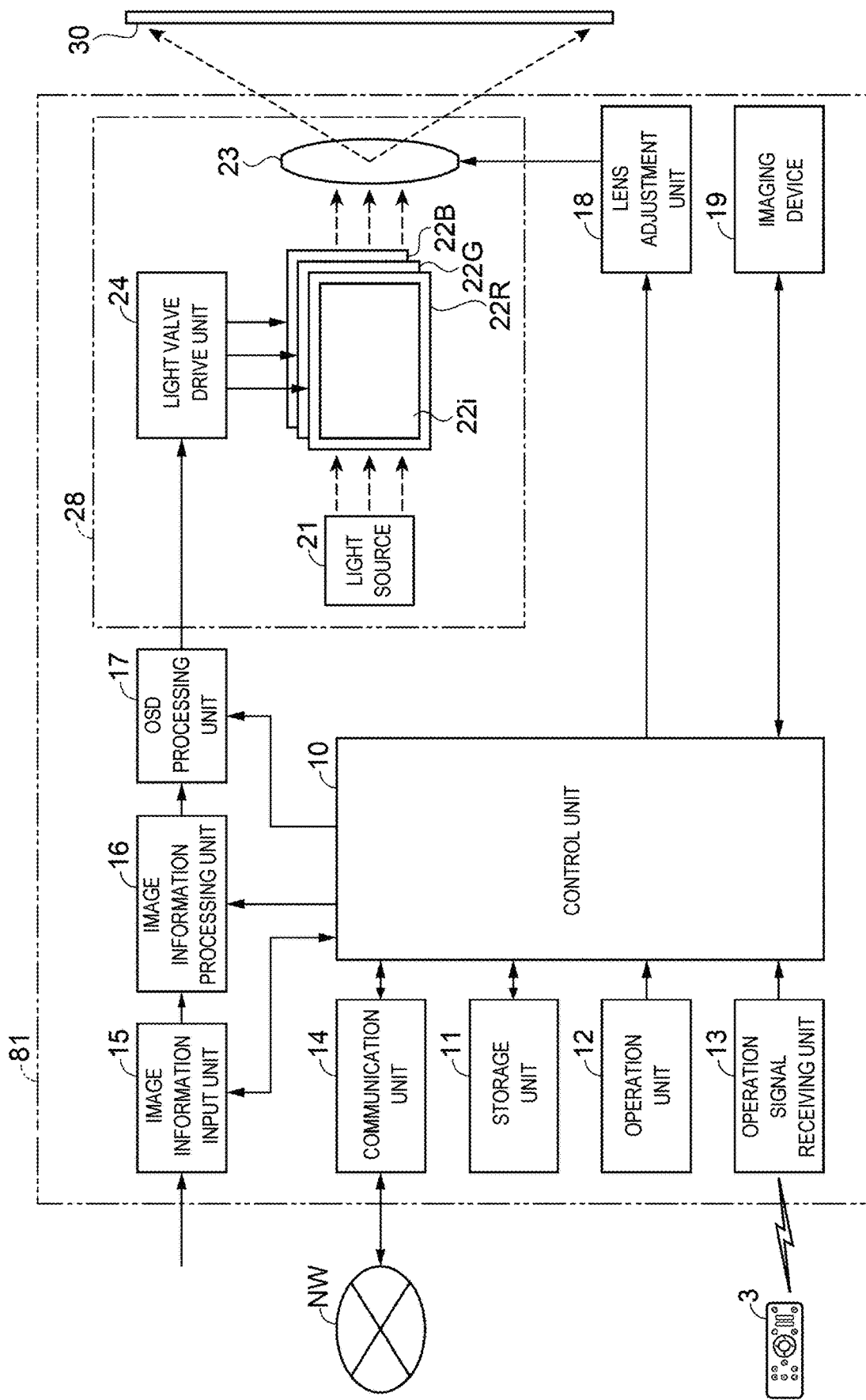
FIG. 2 is a block configuration diagram of a projector.

FIG. 2 is a block diagram showing a schematic configuration of a projector.

Since the three projectors 81, 82, and 83 are the same as described above, a configuration of the projector 81 will be described as a representative.

As shown in FIG. 2, the projector 81 includes a control unit 10, a storage unit 11, an operation unit 12, an operation signal receiving unit 13, a communication unit 14, an image information input unit 15, an image information processing unit 16, an OSD processing unit 17, an image projection unit 28, a lens adjustment unit 18, and an imaging device 19.

The control unit 10 includes one or a plurality of processors, and comprehensively controls an operation of the projector 81 by operating according to a control program stored in the storage unit 11.

The storage unit 11 includes a random access memory (RAM) and a read only memory (ROM). The RAM is used for temporary storage of various data or the like, and the ROM stores the control program for controlling the operation of the projector 81, accompanying data, or the like. The control program stores a start program that instructs an order and a content of processing when starting the projector 81, an alignment control program for images projected by a plurality of projectors when performing stack projection or multi-screen projection, or the like. The accompanying data includes a pattern image or the like for alignment. Further, an automatic fit program performed after the alignment control program is executed is also stored. The automatic fit program is a program that perfectly matches, by using a function such as keystone distortion correction of the projector 81, a composite image whose 80% position adjustment is completed by the alignment control program. Specifically, the projector 81 captures, by the imaging device 19, a composite image for which rough adjustment is completed, analyzes the captured image, and issues an instruction of position adjustment to a projector that needs correction. The position adjustment is executed by a zoom adjustment function, a focus adjustment function, and a keystone distortion correction function of a target projector. The automatic fit program is also referred to as an automatic position adjustment function.

The operation unit 12 includes a plurality of operation keys for a user to give various instructions to the projector 81. The operation keys include a □power key□ for switching the power on and off, a □menu key□ for displaying a menu for performing various settings, or the like. When the user operates various operation keys of the operation unit 12, the operation unit 12 outputs, to the control unit 10, an operation signal according to an operation content.

The operation signal receiving unit 13 includes a communication device compliant with Bluetooth (registered trademark), receives an operation signal from a remote controller 3, decodes the operation signal, and transmits the operation signal to the control unit 10. When performing stack projection or multi-screen projection, Bluetooth functions of slave devices other than the master projector 81 are turned off. Short-range communication is also possible, and for example, infrared communication may be used.

As a preferred example, the communication unit 14 uses a module for wireless communication compliant with the wireless LAN standard. The projector 81 is connected to a network NW via the communication unit 14 and controls the projectors 82, 83 connected to the network NW. Further, an image source such as an image signal is also supplied from the network NW. The communication is not limited to wireless communication, and each device may be connected by wires using a LAN cable. Alternatively, each device may be connected by a daisy chain using a high-definition multimedia interface (registered trademark, HDMI) cable.

The image information input unit 15 is coupled to an external image supply device (not shown) such as a computer or an image reproduction device, and receives image information from the image supply device. Further, when receiving a pattern image or the like for alignment from the control unit 10, the image information input unit 15 performs necessary image processing and outputs the processed image information to the image information processing unit 16.

Under the control of the control unit 10, the image information processing unit 16 performs necessary image processing on the image information received from the image information input unit 15, and outputs the processed image information to the OSD processing unit 17.

Under the control of the control unit 10, the OSD processing unit 17 performs processing of overlapping an on-screen display (OSD) image such as a message image or a menu image on the image for display. The OSD processing unit 17 includes an OSD memory (not shown), and stores OSD image information representing figures, fonts, or the like for forming an OSD image. A pattern image for alignment may be stored. When the control unit 10 instructs the overlapping of the OSD image, the OSD processing unit 17 reads necessary OSD image information from the OSD memory, and synthesizes the OSD image information with the image information received from the image information processing unit 16 such that the OSD image overlaps the image at a predetermined position.

The image projection unit 28 includes a light source 21, three liquid crystal light valves 22R, 22G, and 22B as light modulation devices, a projection lens 23 as a projection optical system, and a light valve drive unit 24. The image projection unit 28 modulates light emitted from the light source 21 using the liquid crystal light valves 22R, 22G, and 22B to form image light, and projects full-color image light onto the screen 30 from the projection lens 23.

The light source 21 includes a solid-state light source such as a light emitting diode or a semiconductor laser. A discharge type light source lamp such as an ultra-high pressure mercury lamp or a metal halide lamp may be used. The light emitted from the light source 21 is converted into light having a substantially uniform brightness distribution by an integrator optical system (not shown), and is separated into color light components of red (R), green (G), and blue (B), that are three primary colors of light, by a color separation optical system (not shown), and then the color light components enter the liquid crystal light valves 22R, 22G, and 22B, respectively.

Each of the liquid crystal light valves 22R, 22G, and 22B includes a transmission type liquid crystal panel or the like in which a liquid crystal is sealed between a pair of transparent substrates. An image forming region 22$i$ having a rectangular shape and composed of a plurality of pixels arranged in a matrix is formed on each liquid crystal panel, and a drive voltage can be applied to the liquid crystal for each pixel.

The light valve drive unit 24 forms an image in the image forming region 22$i$ of the respective liquid crystal light valves 22R, 22G, and 22B. Specifically, the light valve drive unit 24 applies, to each pixel of the image forming region 22$i$, a drive voltage corresponding to the image information received from the OSD processing unit 17, and sets each pixel to a light transmittance according to the image information. The light emitted from the light source 21 is modulated for each pixel by passing through the image forming region 22$i$ of the respective liquid crystal light valves 22R, 22G, 22B, and image light corresponding to the image information is formed for each color light. The formed image light of each color is synthesized for each pixel by a color synthesis optical system (not shown) to become image light representing a color image, which is then magnified and projected onto the screen 30 by the projection lens 23.

The image information input unit 15, the image information processing unit 16, and the OSD processing unit 17 may include one or a plurality of processors or the like, or may include a dedicated processing device such as an application specific integrated circuit (ASIC) or a field programmable gate array (FPGA).

The projection lens 23 includes a plurality of concavo-convex lenses, and actuators for zoom adjustment, focus adjustment, and lens shift are attached to a specific lens in the plurality of concavo-convex lenses. As the actuator, a linear actuator or the like including a motor such as a piezoelectric motor is suitable.

The lens adjustment unit 18 includes a drive circuit for driving these actuators, and performs zoom adjustment, focus adjustment, and lens shift adjustment according to an instruction from the control unit 10. In the lens shift adjustment, the projection lens 23 is moved vertically and horizontally on a plane substantially orthogonal to a central optical axis of the projection lens 23.

The imaging device 19, as an imaging element, is a camera including a complementary metal oxide semiconductor (CMOS) sensor, is disposed in front of the projector 81, and is provided so as to be able to capture a projected image projected on a screen. The imaging element may be any element capable of capturing an image, and may be, for example, a charge couple device (CCD) sensor.

In the above, the transmission type liquid crystal light valves 22R, 22G, and 22B are described as the light modulation device, but a reflection type light modulation device such as a reflection type liquid crystal light valve may be used. Further, a digital mirror device or the like that modulates the light emitted from the light source 21 by controlling an emission direction of the incident light for each micro mirror as a pixel may be used. Further, the configuration is not limited to the configuration in which a plurality of light modulation devices are provided for each color light, and a configuration in which a plurality of color lights are modulated by time division using one light modulation device may be used.

Further, in the above, the imaging device 19 is described as being configured as a part of the projector 81, but the imaging device 19 may be a unit separate from the projector 81. For example, as shown in FIG. 1, a smartphone 119 including a camera may be used as the imaging device 19. The smartphone 119 includes a module for wireless communication compliant with the wireless LAN standard, is connected to the network of the image projection system 100, and is set to be able to communicate with the projectors 81, 82, and 83. Alternatively, a personal computer having a camera and a communication function may be used as the imaging device 19. Thus, even when the imaging device 19 is configured as a separated unit, the position adjustment of the projected image can be performed as a case in which the imaging device 19 is configured as a part of the projector 81.

Position Adjustment Method-1 for Projected Image

Figure 4A:
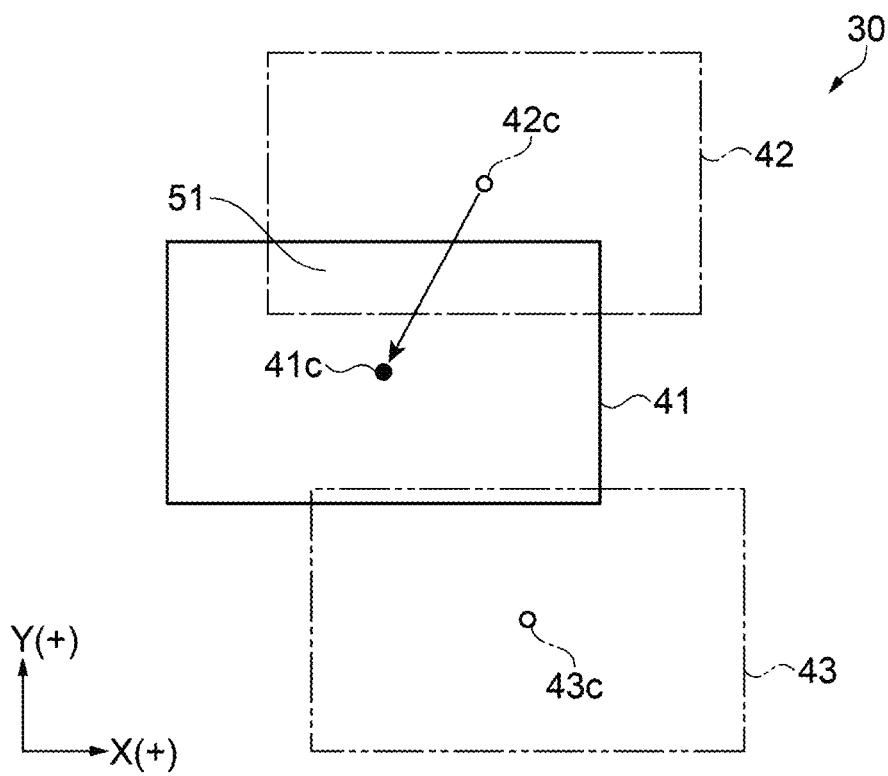
FIG. 4A is a diagram showing one aspect of a composite image.
Figure 4B:
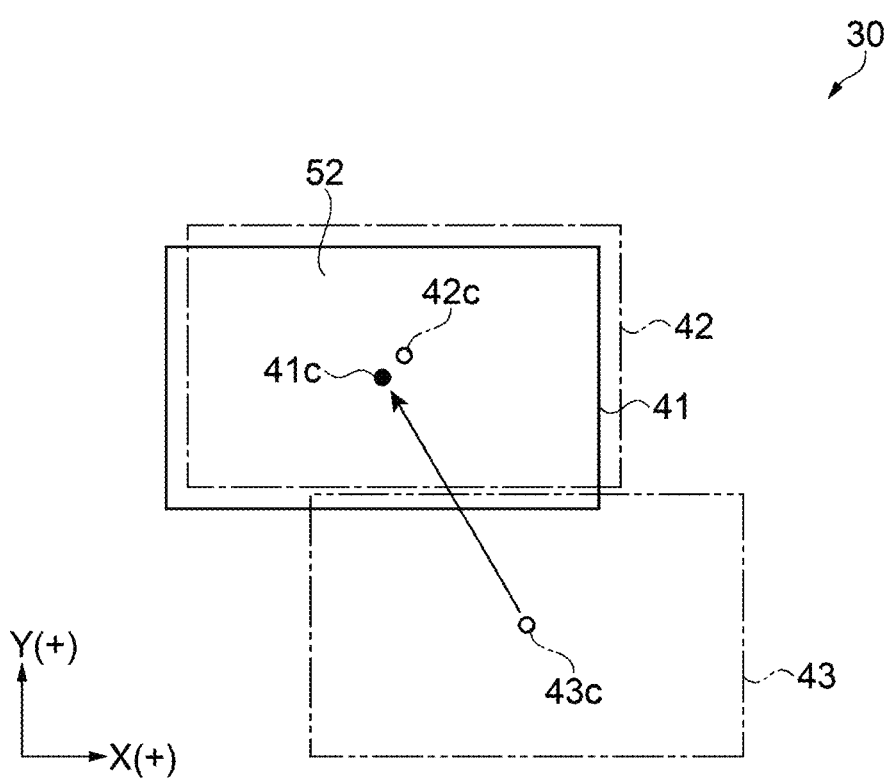
FIG. 4B is a diagram showing one aspect of the composite image.

FIG. 3 is a flowchart showing a flow of a position adjustment method for the projected image. FIGS. 4A, 4B, and 4C are diagrams each showing one aspect of a composite image.

Here, a method of controlling the image projection system 100 during stack image projection will be described mainly with reference to FIG. 3 together with other figures as appropriate. The following processing is executed mainly by the projector 81 controlling the slave projectors 82, 83. Specifically, the projector 81 controls the slave projectors 82, 83 by executing the alignment control program for the projected image of the storage unit 11. The processing according to the flowchart shown in FIG. 3 is also referred to as standard processing.

In step S71, the projector 81 projects a first pattern 41, which is a reference pattern, as a test pattern for alignment of the projected image. As shown in FIG. 4A, the first pattern 41 is a plain rectangular image, and a color tone thereof is full solid green.

In step S72, the projector 82 projects a second pattern 42 as a test pattern, and the projector 83 projects a third pattern 43 as a test pattern. The second pattern 42 is a plain rectangular image, and a color tone thereof is full solid blue. The third pattern 43 is a plain rectangular image, and a color tone thereof is full solid red. As shown in FIG. 4A, the second pattern 42 is projected with a part of an overlapping portion 51 on an upper right side of the first pattern 41. The third pattern 43 is projected with a slight overlap on a lower right of the first pattern 41.

In step S73, the projector 81 captures, by the imaging device 19, a composite image including the first pattern 41, the second pattern 42, and the third pattern 43. The projector 81 may capture a composite image including the first pattern 41 and the second pattern 42.

In step S74, the projector 81 determines whether an area of the overlapping portion 51 of the second pattern 42 with respect to the first pattern 41 in the captured image is equal to or larger than a predetermined ratio. Specifically, the captured image is analyzed, and an area of the first pattern 41, an area of the second pattern 42, and the area of the overlapping portion 51 are calculated. Since a color tone of the overlapping portion 51 is sky blue due to a mixture of green light of the first pattern 41 and blue light of the second pattern 42, the area may be calculated by using a difference in the color tone. Further, even when a projected surface has irregularities in the first pattern 41 and the second pattern due to full solid images, since an influence of the irregularities is smaller than that of a cross-shaped collation pattern or the like, the area can be calculated based on the captured image.

Then, when the predetermined ratio is 80%, it is determined whether the area of the overlapping portion 51 with respect to the area of the first pattern 41 is equal to or larger than 80%. When the area is equal to or larger than the predetermined ratio, since the projected image is within an automatically-adjustable range, alignment processing of the second pattern 42 is completed. When the area is less than the predetermined ratio, the processing proceeds to step S76. In the case of FIG. 4A, since the ratio is less than 80%, the processing proceeds to step S76. The predetermined ratio is not limited to 80%, and as long as the projected image can be adjusted by the automatic position adjustment function, the predetermined ratio may be set within a range of 70% to 90%.

In step S76, a lens shift amount required to overlap the second pattern 42 on the first pattern 41 is derived. In the case of FIG. 4A, the captured image is analyzed, a center of gravity 41c in the first pattern 41 and a center of gravity 42c in the second pattern 42 are calculated, a difference between coordinates of the center of gravity 41c and coordinates of the center of gravity 42c in XY coordinates is calculated, and the required lens shift amount is derived from the difference.

In step S77, the projector 81 instructs the projector 82 to perform lens shift using the lens shift amount derived in step S76. In the case of FIG. 4A, as shown by an arrow in the figure, the projector 82 performs the lens shift such that a position of the center of gravity 41c of the first pattern 41 coincides with a position of the center of gravity 42c of the second pattern 42. Specifically, the lens shift having the derived amount in the X(−) and Y(−) directions is performed such that the second pattern 42 moves along a vector indicated by the arrow. After the lens shift is performed, the processing returns to step S73.

In step S73, the projector 81 captures, by the imaging device 19, a composite image after the lens shift is executed. As shown in FIG. 4B, the second pattern 42 after the lens shift is in a state of substantially overlapping the first pattern 41.

In step S74, the projector 81 determines whether an area of an overlapping portion 52 of the second pattern 42 with respect to the area of the first pattern 41 in the captured image is equal to or larger than 80%. In the case of FIG. 4B, since the area of the overlapping portion 52 between the first pattern 41 and the second pattern 42 is equal to or larger than 80%, the alignment processing of the second pattern is completed.

When there is one slave projector, the processing is completed, but in the present embodiment, since there are two slave projectors, subsequently, the next alignment processing of the projector 83 is performed. Specifically, the processing is performed to bring a position of the third pattern 43 closer to the first pattern 41 which is the reference pattern. The processing is the same as the processing of bringing a position of the second pattern 42 closer to the first pattern 41, and the processing after step S73 in FIG. 3 is performed on the third pattern 43.

In step S74, the projector 81 determines whether an area of an overlapping portion of the third pattern 43 with respect to the area of the first pattern 41 in the captured image in FIG. 4B after the lens shift is equal to or larger than 80%. In the case of FIG. 4B, since the area of the overlapping portion of the third pattern 43 is less than 80%, the processing proceeds to step S76. Since a color tone of the overlapping portion is yellow due to a mixture of the green light of the first pattern and red light of the third pattern, the area may be calculated by using a difference in the color tone.

In step S76, a lens shift amount required to overlap the third pattern 43 on the first pattern 41 is derived. In the case of FIG. 4B, the captured image is analyzed, the center of gravity 41c of the first pattern 41 and a center of gravity 43c of the third pattern 43 are calculated, a difference between the coordinates of the center of gravity 41c and coordinates of the center of gravity 43c in the XY coordinates is calculated, and the required lens shift amount is derived from the difference.

In step S77, the projector 81 instructs the projector 83 to perform lens shift using the lens shift amount derived in step S76. In the case of FIG. 4B, as shown by an arrow in the figure, the projector 83 performs the lens shift such that the position of the center of gravity 41c of the first pattern 41 coincides with a position of the center of gravity 43c of the third pattern 43. Specifically, the projector 83 performs the lens shift having the derived amount in the X(−) and Y(+) directions such that the third pattern 43 moves along a vector indicated by the arrow. When the lens shift is completed, the processing returns to step S73.

In step S73, the projector 81 captures, by the imaging device 19, a composite image after the lens shift is executed. As shown in FIG. 4C, the third pattern 43 after the lens shift is in a state of substantially overlapping the first pattern 41.

In step S74, the projector 81 determines whether the area of the overlapping portion of the third pattern 43 with respect to the area of the first pattern 41 in the captured image is equal to or larger than 80%. In the case of FIG. 4C, since the area of the overlapping portion between the first pattern 41 and the third pattern 43 is equal to or larger than 80%, the alignment processing of the third pattern 43 is completed. When there are still slave projectors, the processing after step S73 may be repeated for the number of projectors.

When the composite image is in the state shown in FIG. 4C, the subsequent detailed alignment processing can be performed by the above automatic position adjustment function.

As described above, according to the control method, the projector 81 determines whether the area of the overlapping portion 51 of the second pattern 42 with respect to the first pattern 41 in the captured image, which is obtained by capturing the composite image including the first pattern 41 by the projector 81 and the second pattern 42 by the projector 82, is equal to or larger than a predetermined ratio. When the area is less than the predetermined ratio, the projector 82 performs the lens shift by a lens shift function of the projector 82 such that the second pattern 42 overlaps the first pattern 41. Therefore, it is possible to perform alignment of the projected image by using an area that is not easily influenced by the projected surface such as irregularities.

Therefore, according to the control method, a position of the projected image can be adjusted regardless of a state of the projected surface. In other words, it is possible to provide the image projection system 100 capable of adjusting the position of the projected image regardless of the state of the projected surface.

Further, the lens shift by the lens shift function of the projector 82 is performed such that the position of the center of gravity 41*c* of the first pattern 41 coincides with the position of the center of gravity 42*c* of the second pattern in the captured image. According to the method, the alignment of the first pattern 41 and the second pattern 42 is performed with the positions of the centers of gravity as targets. In the analysis of the captured image, the positions of the centers of gravity can be extracted even when the pattern image is slightly distorted.

Therefore, based on the positions of the centers of gravity, the lens shift can be performed such that the second pattern 42 overlaps the first pattern 41.

Further, when there is the third projector 83 that projects the third pattern 43, the projector 81 determines whether the area of the overlapping portion of the third pattern 43 with respect to the first pattern 41 in the captured image, which is obtained by capturing a composite image including the first pattern 41, the second pattern 42, and the third pattern 43, is equal to or larger than a predetermined ratio. When the area is less than the predetermined ratio, the projector 83 performs the lens shift by a lens shift function of the projector 83 such that the third pattern 43 overlaps the first pattern 41.

Therefore, the control method can be applied to an image projection system using three projectors. Similarly, when there are three or more projectors, alignment of projected images can be performed one by one with reference to the first pattern 41.

Further, a first color tone of the first pattern 41 is set to green, a second color tone of the second pattern 42 is set to blue, and a third color tone of the third pattern 43 is set to red.

Accordingly, since a portion in which all the patterns overlap each other is a white projected image, it is easy to visually grasp a state of the position adjustment. Further, color information can be used when analyzing the captured image.

Second Embodiment

Position Adjustment Method-2 for Projected Image

FIG. 5 is a flowchart showing a flow of a position adjustment method for a projected image according to a second embodiment.

Here, a method of controlling the image projection system 100 during stack image projection, which is different from that of the first embodiment, will be described mainly with reference to FIG. 5 together with other figures as appropriate. The control method related to position adjustment according to the present embodiment is suitable when there are two or more slave projectors, and alignment of the projected image can be performed more efficiently. The part same as the description in the first embodiment is omitted.

Step S91 is the same as step S71. As shown in FIG. 4C, the projector 81 projects the first pattern 41, which is the reference pattern.

Step S92 is the same as step S72. The projector 82 projects the second pattern 42, and the projector 83 projects the third pattern 43.

Step S93 is the same as step S73. The projector 81 captures, by the imaging device 19, the composite image including the first pattern 41, the second pattern 42, and the third pattern 43 shown in FIG. 4C.

In step S94, the projector 81 determines whether there is an overlapping portion where all the pattern images overlap each other in the captured image. When there is an overlapping portion, the processing proceeds to step S95. When there is no overlapping portion, the processing proceeds to step S96. In step S96, since there is no overlapping portion, position adjustment is performed on the patterns one by one according to the flowchart of the standard processing in FIG. 3.

In the case of FIG. 4C, since there is an overlapping portion 61 in which the first pattern 41, the second pattern 42, and the third pattern 43 overlap each other, the processing proceeds to step S95. Since a color tone of the overlapping portion 61 is white due to a mixture of green light of the first pattern 41, blue light of the second pattern 42, and red light of the third pattern 43, an overlapping portion may be detected by using a difference in the color tone.

In step S95, the projector 81 determines whether an area of the overlapping portion 61 with respect to the area of the first pattern 41 in the captured image is equal to or larger than a predetermined ratio. Specifically, the captured image is analyzed, and the area of the first pattern 41 and the area of the overlapping portion 61 in which the three patterns overlap each other are calculated. Then, it is determined whether the area of the overlapping portion 61 with respect to the area of the first pattern 41 is equal to or larger than the predetermined ratio. When the area is equal to or larger than the predetermined ratio, the projected image is within a range of an automatic position adjustment function, and the alignment processing is completed. When the area is less than the predetermined ratio, the processing proceeds to step S97. In the case of FIG. 4C, since the area of the overlapping portion 61 is equal to or larger than 80% as the predetermined ratio, the alignment processing is completed.

In step S97, a pattern image that requires position adjustment is extracted from an analysis result in step S95, and a lens shift amount in the pattern image is derived. The derivation method is the same as that described in the first embodiment.

In step S98, the projector 81 instructs a slave projector that needs position adjustment to perform lens shift using the lens shift amount derived in step S97. When the lens shift is completed, the processing returns to step S93.

As described above, according to the control method, the following effects can be obtained in addition to the effect in the first embodiment.

The projector 81 obtains the area of the overlapping portion 61 in which the first pattern 41, the second pattern 42, and the third pattern 43 overlap each other in the captured image, which is obtained by capturing the composite image including the first pattern 41 by the projector 81, the second pattern 42 by the projector 82, and the third pattern 43 by the projector 83, and determines whether the area of the overlapping portion 61 with respect to the first pattern 41 is equal to or larger than the predetermined ratio. When the area is less than the predetermined ratio, at least one of the projector 82 and the projector 83 performs the lens shift by the lens shift function of the projector 82 or the lens shift function of the projector 83 such that at least one of the second pattern 42 and the third pattern 43 overlaps the first pattern 41.

Therefore, when the area of the overlapping portion 61 in which the three patterns overlap each other is equal to or larger than the predetermined ratio, rough adjustment can be completed immediately.

Therefore, the position of the projected image can be adjusted efficiently.

Third Embodiment

Another Aspect of Collation Pattern

Figure 6:
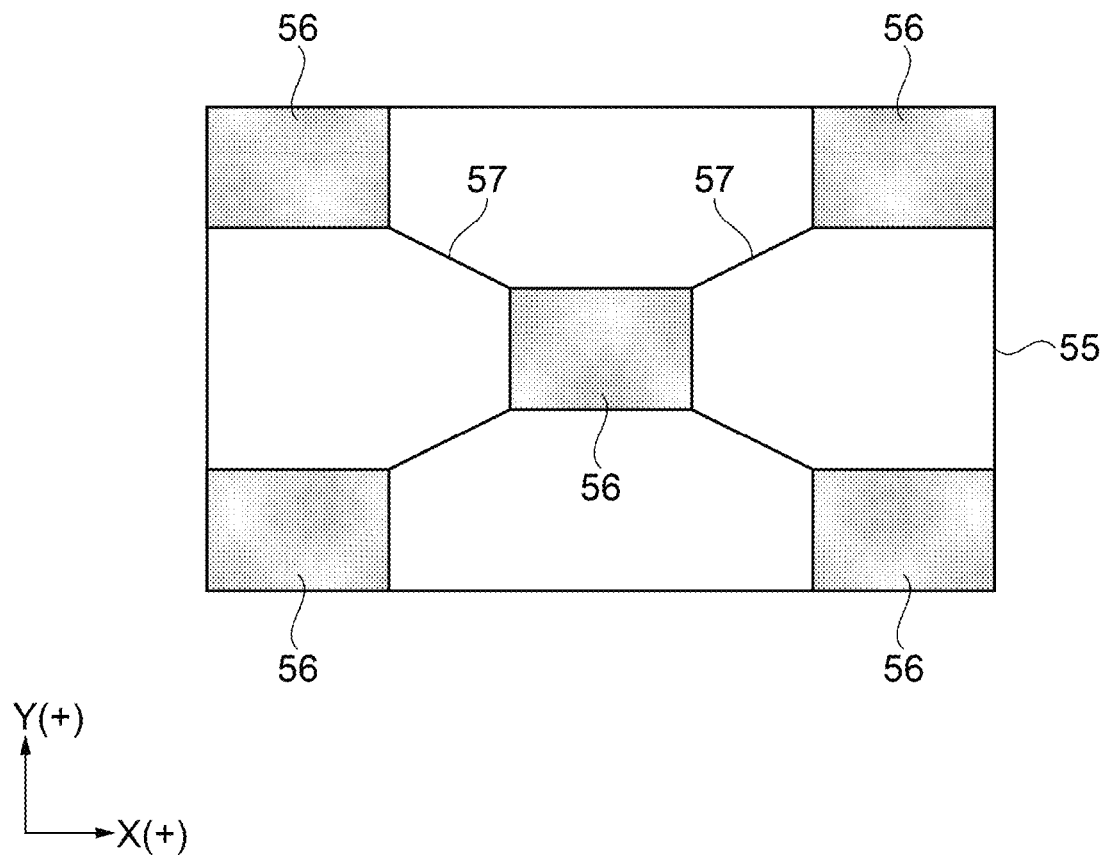
FIG. 6 is a diagram showing different aspects of a test pattern.

FIG. 6 is a diagram showing another aspect of a collation pattern and corresponds to FIG. 4A.

In each of the above embodiments, it is described that a plain and full solid color image is used as a test pattern for alignment of a projected image, but the present disclosure is not limited thereto. For example, a pattern 55 shown in FIG. 6 may be used.

The pattern 55 in FIG. 6 is a rectangle, and is a pattern image including two diagonal lines 57 of the rectangle and five small rectangles 56. The small rectangles 56 are arranged in a center and four corners of the rectangle of the pattern 55. The two diagonal lines 57 overlap diagonal lines of the small rectangle 56 in the center.

The two diagonal lines 57 and the five small rectangles 56 have the same color tone. For example, when test patterns of three projectors are used, the test patterns may be used as green, blue, and red as in the above embodiments. Even when this pattern is used, the same effects as those of the above embodiments can be obtained.

Fourth Embodiment

Position Adjustment Method in Multi-Screen Projection

In each of the above embodiments, the alignment method of the projected image during the stack projection is described, and the alignment method using the overlapping area of the test patterns can be applied even when performing multi-screen projection.

For example, in the case of tiling images that are continuous vertically are projected using two projectors, as in the first embodiment, when an full solid pattern image is projected on each projector and an overlapping area of an upper pattern with respect to a reference lower pattern is equal to or larger than a predetermined ratio, since an overlapping amount is too large, the upper pattern is moved. The predetermined ratio is, for example, 10%. Accordingly, even when multi-screen projection is performed, it is possible to perform alignment of a composite image in the same manner as in each of the above embodiments.

What is claimed is:

1. A method of controlling an image projection system that includes a plurality of projectors including a first projector and a second projector each having a lens shift function and that includes an imaging device, the method comprising:
   projecting, by the first projector, a first pattern having a first color tone;
   projecting, by the second projector, a second pattern having a second color tone;
   generating, by the imaging device, a captured image obtained by capturing a composite image including the first pattern and the second pattern;
   determining, by the first projector, whether an area of an overlapping portion of the second pattern with respect to the first pattern in the captured image is equal to or larger than a predetermined ratio; and
   causing, by the first projector, the second projector to perform lens shift by the lens shift function of the second projector such that the second pattern overlaps the first pattern, when the area is less than the predetermined ratio.

2. The method of controlling an image projection system according to claim 1, wherein
   the lens shift by the lens shift function of the second projector is performed such that a position of a center of gravity of the first pattern coincides with a position of a center of gravity of the second pattern in the captured image.

3. The method of controlling an image projection system according to claim 1, wherein
   the plurality of projectors further includes a third projector configured to project a third pattern having a third color tone, and
   the control method further comprises:
      generating an captured image obtained by capturing a composite image including the first pattern, the second pattern, and the third pattern;
      determining, by the first projector, whether an area of an overlapping portion of the third pattern with respect to the first pattern in the captured image is equal to or larger than a predetermined ratio; and
      causing, by the first projector, the third projector to perform lens shift by a lens shift function of the third projector such that the third pattern overlaps the first pattern, when the area is less than the predetermined ratio.

4. The method of controlling an image projection system according to claim 1, wherein
   the predetermined ratio is 80%.

5. The method of controlling an image projection system according to claim 3, wherein
   the first color tone is green,
   the second color tone is blue, and
   the third color tone is red.

6. A method of controlling an image projection system that includes a plurality of projectors including a first projector, a second projector, and a third projector each having a lens shift function, and that includes an imaging device, the method comprising:
   projecting, by the first projector, a first pattern having a first color tone;
   projecting, by the second projector, a second pattern having a second color tone;
   projecting, by the third projector, a third pattern having a third color tone;
   generating, by the imaging device, a captured image obtained by capturing a composite image including the first pattern, the second pattern, and the third pattern;
   obtaining, by the first projector, an area of an overlapping portion in which the first pattern, the second pattern, and the third pattern overlap each other in the captured image, and determining whether the area of the overlapping portion with respect to the first pattern is equal to or larger than a predetermined ratio; and
   causing, by the first projector, at least one of the second projector and the third projector to perform lens shift by the lens shift function of the second projector or the lens shift function of the third projector such that at least one of the second pattern and the third pattern overlaps the first pattern, when the area is less than the predetermined ratio.

7. An image projection system including a plurality of projectors having a lens shift function and an imaging device, the image projection system comprising:
- a first projector configured to project a first pattern having a first color tone; and
- a second projector configured to project a second pattern having a second color tone, wherein
- the first projector is communicably coupled to the second projector and the imaging device,
- the imaging device is configured to capture a composite image including the first pattern and the second pattern, and
- the first projector causes, when an area of an overlapping portion of the second pattern with respect to the first pattern in the captured image is less than a predetermined ratio, the second projector to perform lens shift by the lens shift function of the second projector such that the second pattern overlaps the first pattern.

* * * * *